Patented Sept. 30, 1952

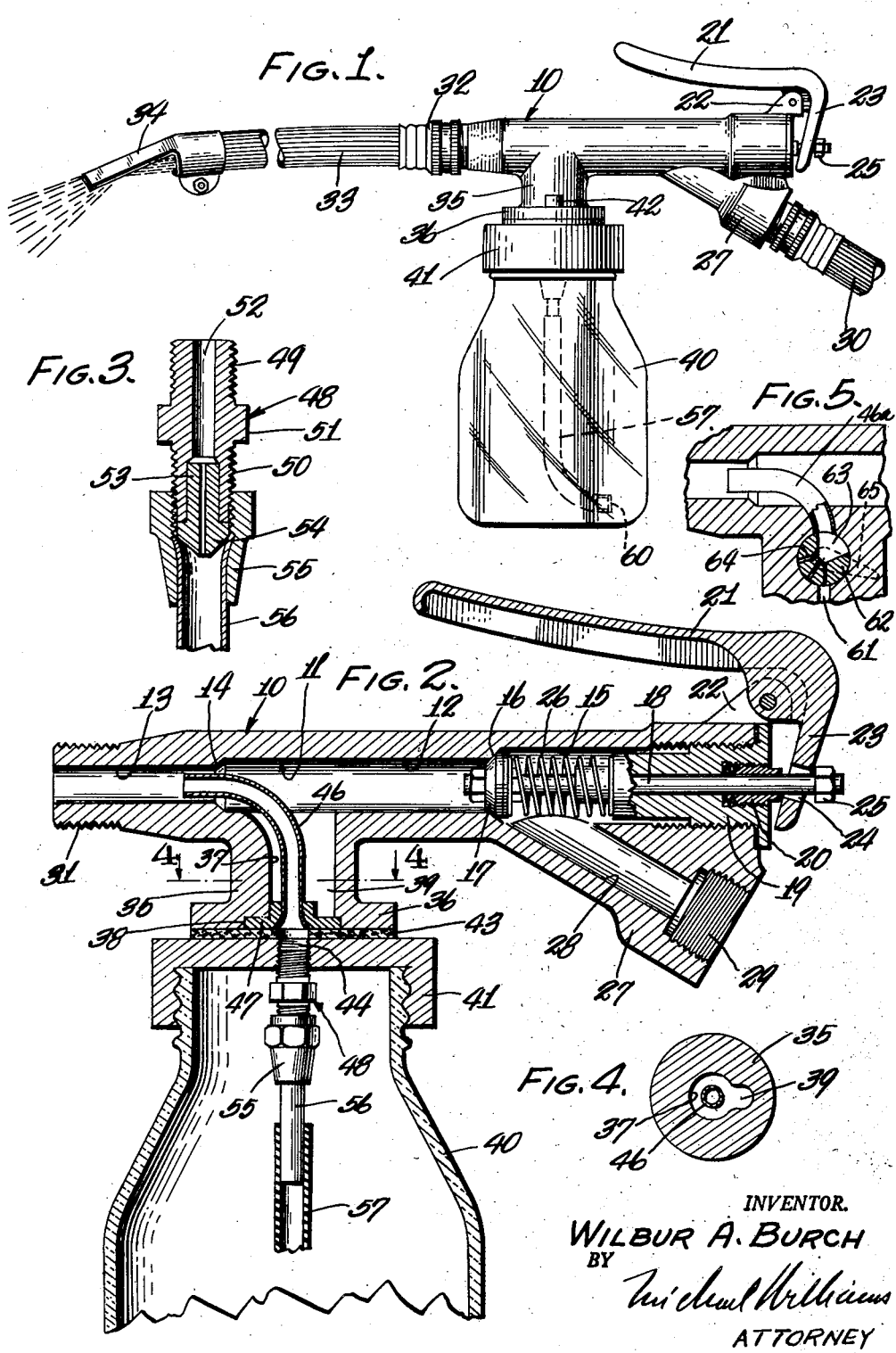

2,612,403

UNITED STATES PATENT OFFICE 2,612,403

DEVICE FOR MIXING FLUIDS

Wilbur A. Burch, Warren, Ohio

Application August 2, 1949, Serial No. 108,112

7 Claims. (Cl. 299—84)

My invention relates to devices for mixing fluids, and more particularly to devices wherein a plurality of fluids are mixed and issue in a common stream, and the principal object of my invention is to provide new and improved devices of this character.

My invention is particularly adaptable to mixing a fluid fertilizer with a supply of water, and in this respect provides a liquid fertilizer applicator of new and novel design. However, although the following description is directed particularly to devices of the liquid fertilizer applicator type, it will be understood that my invention is not limited to such particular application and has uses not herein particularly mentioned.

In the drawing accompanying this specification, and forming part of this application, there is shown, for purposes of illustration, an embodiment which my invention may assume, and in this drawing:

Figure 1 is an elevational view of a device embodying my invention, the applicating hose being fragmentarily shown, Figure 2 is an enlarged fragmentary sectional view of the device, Figure 3 is an enlarged fragmentary sectional view of a conduit connection, Figure 4 is a transverse sectional view corresponding generally to the line 4—4 of Figure 2, and Figure 5 is a fragmentary sectional view of a modified construction.

Referring to the drawing, the embodiment herein disclosed to illustrate the invention comprises a body 10 having a longitudinal opening 11 extending therethrough. The operative part of the opening 11 comprises two portions 12 and 13, each here shown as circular in cross-section, the portion 12 being of greater diameter than the portion 13, and these portions meeting at a tapered junction 14.

The opening portion 12 is aligned with a larger diameter opening 15 which forms a conical valve seat 16 with the portion 12. A valve 17 is arranged for cooperation with the seat 16, this valve being carried by a valve stem 18 which is slidable through a plug 19 threaded into the adjacent end of the body 10. The plug 19 is provided with a suitable packing gland 20 to prevent leakage along the stem 18.

An operating handle 21 is pivotally carried by ears 22 extending from the body 10, the handle having an arm 23 formed with an aperture 24 for passing the valve stem 18. A nut 25 is threaded on the extremity of the valve stem 18, and forms an abutment against which the arm 23 may be forced so as to move the valve stem in a direction to unseat the valve 17. A coil spring 26 is interposed between the valve 17 and the plug 19, and normally urges the valve 17 to seating relation with respect to the seat 16.

The body 10 has an off-set enlargement 27 formed with an aperture 28 which intersects the opening 15 at the rear of the valve 17. The aperture 28 is adapted to be connected to a source of water under pressure, such as an ordinary water tap, and in this respect is provided with a threaded portion 29 for reception of a threaded plug at the end of a water hose 30 of suitable length so that the body 10 may be readily moved from place to place with respect to a lawn or garden.

The opposite end of the body 10 is threaded, as shown at 31, for reception of a coupling 32 connected to a hose 33. The hose 33 should be relatively short, so as not to create undue back pressure in the body 10, and is primarily for the purpose of providing a flexible outlet adapted to be manipulated to various sprinkling positions. Preferably, a spreader device 34 is secured to the free end of the hose 33, and this may take the form of a split clamp attached to the hose and a generally flat deflecting portion positioned to fan-out the stream issuing from the hose 33, so as to avoid a solid stream of water which may wash away soil from the roots of plants.

The body 10, intermediate its ends, is formed with a laterally projecting portion 35 terminating in a flange 36. The projecting portion 35 is formed with an opening 37 extending transversely with respect to the opening 11 and intersecting the same. The terminal face of the flange 36 is formed with a recess 38 which constitutes an enlargement of the opening 37 and as best seen in Figures 2 and 4, the opening 37 is rearwardly relieved, as shown at 39, for a purpose later to be described.

A receptacle 40, which may be an ordinary Mason jar, is carried by the body 10, and as here shown the receptacle 40 has screw connection with a cap 41. The cap 41 is connected to the flange 36 by means of bolts 42, only one of which is visible in Figure 1. A gasket 43 is interposed between the cap 41 and the flange 36 to insure against leakage. The cap 41 is formed with a threaded aperture 44 and the gasket is formed with an aperture in line with the threaded aperture 44.

A conduit is provided for delivering liquid fertilizer from the receptacle 40 to the opening 11 in the body 16, and in this instance comprises a tube 46 having a collar 47 secured to its lower end, the collar having step formations to closely fit within the transverse aperture 37 and the recess 38 and thus position the conduit with respect to the body. As best seen in Figure 2, the lower end of the conduit 46 is flared into a conical opening in the collar 47, and the conduit is positioned directly over the apertures in the gasket 43 and the cover 40. It will be appreciated that the collar 47 is clamped between the projecting portion 35 and the cover 41 when these parts are connected by the bolts 42, and the collar closely fits adjoining surfaces to hold the conduit 46 in proper position.

The conduit 46 extends upwardly in the transverse aperture 37 and into the larger portion 12 of the opening 11, and is bent so that its free end extends into the smaller portion 13 of the opening 11 and in spaced relation with respect to the peripheral wall surface thereof. The conduit 46 has its opening directed so that liquid fertilizer issuing therefrom will be directed in line with the flow of water. It will be appreciated that the conduit 46 may be readily moved to assembled position by inserting it through the transverse aperture 37, the enlargement 39 of the aperture permitting a tilting of the conduit during movement to assembled position.

Threaded into the aperture 44 in the cover 41 is a coupling nipple 48 comprising threaded portions 49 and 50 on opposite sides of a wrench-applying portion 51. The nipple 48 has a bore 52 therethrough, this bore being enlarged at its lower end to receive an orifice plug 53 which has an opening of fixed size. The orifice plug 53 has a conical head 54 providing a shoulder which abuts against the lower terminal surface of the nipple 48. A flared-type nut 55 is threaded on the portion 50 of the nipple 48, this nut carrying a short piece of metal tube 56 which is flared into the nut. When the nut is drawn tight on the nipple 48, the flared tube portion sealingly engages the conical head 54 of the orifice plug 53, thus providing a simple, yet effective, connection, that may be readily taken apart so as to provide for replacement of the orifice plug 53 with another of a different fixed opening. A piece of rubber tubing 57 is preferably affixed to the lower end of the tubing 56, and as shown in dotted lines in Figure 1, the tubing 57 is preferably of such length that it curves over the inner bottom surface of the receptacle 40, thus insuring that liquid from the lowermost portion of the receptacle may be utilized. Preferably, a screen 60 is inserted into the lower end of the tube 57, to screen out particles which may tend to block the orifice in the plug 53.

In operation the hose 30 is connected to a suitable source of water under pressure, and the receptacle 40 is supplied with a suitable liquid fertilizer. The device may be carried in the hands of a user, one hand encircling the rear portion of the body 10 so that the thumb or fingers are in position to operate the valve handle 21, and the other hand holding the hose 33 to manipulate the spreader device 34.

To operate the device, it is merely necessary to depress the valve handle 21 so as to open the valve 17. Water will then flow through aperture 28, past valve 17, through large and small portions 12 and 13 of opening 11, and through and outwardly of hose 33.

As water flows from the larger portion 12 of the opening 11 to the smaller portion, its velocity is increased in accordance with well known principles of fluid flow. The upper end of the conduit 46 is positioned in the water flow, and particularly within the portion of increased velocity, causing the water stream to flow around this end of the conduit. Because of the increased velocity of fluid flow and/or because the conduit 46 is positioned in this fluid flow, the water stream is caused to flow around the conduit 46, a low pressure area in advance of the conduit opening is produced, whereby liquid fertilizer is drawn from the receptacle and through the conduit 46 and is directed into the stream of water to mix therewith, the mixture issuing as a common stream from the hose 33.

It is pointed out that flow of water under certain pressure through the opening 11 will create a predetermined low pressure area in advance of the opening of the conduit 46. Thus, the orifice plug 53, having a fixed opening, will meter a predetermined amount of liquid fertilizer and the proportion of water and fertilizer may be predetermined and then rigidly adhered to. In the event it is desired to change this proportion, it is merely necessary to replace the orifice plug with one having a fixed opening which will give the desired proportion.

Referring to Figure 5, the construction therein disclosed eliminates necessity for replacing orifice plugs, and in this respect the plug 53 is dispensed with. Instead, a passage 61 communicates with the interior of the receptacle 40, by means of the hose 57 or in any other suitable manner. A rotatable valve plug 62 controls flow of fluid through the passage 61 and is formed with an enlarged recess 63 and a plurality of orifice openings 64 (three being herein shown) adapted to provide communication between the passage 61 and a short conduit 46a which corresponds to the conduit 46 hereinbefore described.

Each of the orifice openings 64 may be of different size, and thus will provide desired variation of the amount of fluid fertilizer withdrawn from the receptacle. Further, the plug 62 may be rotated to align a blank wall with the passage 61 and thus stop flow of fertilizer therethrough. In such instance the device may then be used for ordinary watering purposes. A pointer 65, positioned exteriorly of the casing, may be used to rotate the plug 62, and this pointer may cooperate with legend (not shown) which indicates the position of the plug 62.

In view of the foregoing it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A device for mixing two fluids and issuing the mixture in a common stream, comprising: a body having an elongated opening adapted for communication with a first fluid under pressure, and also having a laterally projecting portion formed with an opening extending transversely with respect to said elongated opening and intersecting the same, said projecting portion having a recess in its terminal face; a reservoir for a second fluid, including a cover abutting said terminal face and having removable connection with said projecting portion; a first conduit having a collar seating in said recess and clamped between said cover and said terminal face, said conduit extending through said transverse opening and having an extremity terminating within said elongated opening; and a second conduit for connecting said first conduit with the interior of said reservoir, and comprising a coupling nipple, an orifice plug of fixed opening size within said coupling nipple, and a flared-type nut held in sealing arrangement with said orifice plug.

2. A gun-type device for mixing water with a fluid fertilizer, comprising: a body having an elongated opening comprising two axially aligned portions, one of larger cross-sectional size than the other, the larger portion being adapted for connection to a source of water under pressure, said body also having a laterally projecting portion formed with an opening extending transversely with respect to said elongated opening and intersecting the same, said projecting portion having a recess in its terminal face; valve means for controlling flow of water through said larger portion; a reservoir for the fluid fertilizer, including a cover abutting said terminal face and having removable connection with said projecting portion; a first conduit having a collar seating in said recess and clamped between said cover and said terminal face, said conduit extending through said transverse opening and having an extremity terminating within the smaller portion of said longitudinal opening and having an outlet directed so that fluid fertilizer passing therethrough issues in the direction of water flow; and a second conduit for connecting said first conduit with the interior of said reservoir and comprising a coupling nipple, an orifice plug of fixed opening size within said coupling nipple, and a flared-type nut held in sealing arrangement with said orifice plug.

3. A device for mixing two fluids and issuing the mixture in a common stream, comprising: a body having an elongated opening adapted for communication with a fluid under pressure, and also having a transversely extending opening intersecting said elongated opening and adapted to communicate with another fluid which is drawn through said transverse opening and into contact with the fluid under pressure; and valve means for controlling flow of fluid through said transverse opening, rotatable to various positions to selectively regulate fluid flow.

4. A device for mixing two fluids and issuing the mixture in a common stream, comprising: a body having an elongated opening adapted for communication with a fluid under pressure, and also having a transversely extending opening intersecting said elongated opening and adapted to communicate with another fluid which is drawn through said transverse opening and into contact with the fluid under pressure; and valve means for controlling flow of fluid through said transverse opening, comprising a rotatable plug having a plurality of different sized openings, any one of which may be selectively positioned to pass fluid.

5. A device for mixing two fluids and issuing the mixture in a common stream comprising a body having an elongated opening and a transversely extending opening intersecting said elongated opening, said elongated opening being adapted for communication with a primary fluid under pressure, and a conduit extending through said transverse opening and communicating with a secondary fluid under atmospheric pressure, said conduit being bent to axial alignment with said elongated opening and in the direction of flow of said primary fluid, said conduit being so proportioned with respect to said elongated opening that suction is produced by the flow of said primary fluid to draw said secondary fluid into mixing relation with said primary fluid.

6. A device for mixing two fluids and issuing the mixture in a common stream comprising a body having an elongated opening and a transversely extending opening intersecting said elongated opening, said elongated opening being adapted for communication with a primary fluid under pressure and comprising axially aligned portions with differing diameters providing a Venturi-like passage, and a conduit extending through said transverse opening and communicating with a secondary fluid under atmospheric pressure, said conduit being bent to axial alignment with said elongated opening and in the direction of flow of said primary fluid, said conduit being so proportioned and positioned with respect to said Venturi-like opening that suction is produced by the flow of said primary fluid to draw said secondary fluid into mixing relation with said primary fluid.

7. A device for mixing two fluids and issuing the mixture in a common stream comprising a body having an elongated opening and a transversely extending opening intersecting said elongated opening, said elongated opening being adapted for communication with a primary fluid under pressure and comprising axially aligned portions with differing diameters providing a Venturi-like passage, a conduit extending through said transverse opening and communicating with a secondary fluid under atmospheric pressure, said conduit being bent to axial alignment with said elongated opening and in the direction of flow of said primary fluid, said conduit being so proportioned and positioned with respect to said Venturi-like opening that suction is produced by the flow of said primary fluid to draw said secondary fluid into mixing relation with said primary fluid, and means for metering flow of secondary fluid through said conduit.

WILBUR A. BURCH.

REFERENCES CITED

The following references are of record in the file of this patent:

UNITED STATES PATENTS

| Number | Name | Date |
|---|---|---|
| 1,036,871 | Matheson | Aug. 27, 1912 |
| 1,501,432 | Bleakley | July 15, 1924 |
| 1,554,458 | Nordquist | Sept. 22, 1925 |
| 2,195,811 | Bramsen et al. | Apr. 2, 1940 |
| 2,322,753 | Thomas | June 29, 1943 |